(12) United States Patent
Ziep et al.

(10) Patent No.: US 11,313,664 B2
(45) Date of Patent: Apr. 26, 2022

(54) DEVICE FOR MEASURING THE THICKNESS OF COATINGS

(71) Applicant: MICRO-EPSILON Messtechnik GmbH & Co. KG, Ortenburg (DE)

(72) Inventors: Christian Ziep, Ot Glindenberg (DE); Maik Richter, Magdeburg (DE); Johann Hinken, Magdeburg (DE)

(73) Assignee: MICRO-EPSILON Messtechnik GmbH & Co. KG, Ortenburg (DE)

( * ) Notice: Subject to any disclaimer, the term of this patent is extended or adjusted under 35 U.S.C. 154(b) by 701 days.

(21) Appl. No.: 16/318,372

(22) PCT Filed: Aug. 14, 2018

(86) PCT No.: PCT/EP2018/071992
§ 371 (c)(1),
(2) Date: Jan. 17, 2019

(87) PCT Pub. No.: WO2019/063185
PCT Pub. Date: Apr. 4, 2019

(65) Prior Publication Data
US 2021/0372765 A1    Dec. 2, 2021

(30) Foreign Application Priority Data

Sep. 27, 2017   (DE) .......................... 102017122406.8

(51) Int. Cl.
*G01B 7/06*     (2006.01)
*G01B 15/02*    (2006.01)
(52) U.S. Cl.
CPC .................................. *G01B 7/105* (2013.01)

(58) Field of Classification Search
CPC ...................................................... G01B 7/105
See application file for complete search history.

(56) References Cited

U.S. PATENT DOCUMENTS

2006/0164104 A1*   7/2006   Tada ...................... G01B 15/02
                                                                324/646
2009/0278552 A1    11/2009  Jakkula et al.
(Continued)

FOREIGN PATENT DOCUMENTS

DE     202009012483 U1   12/2009
EP         2620741 A1    7/2013
(Continued)

OTHER PUBLICATIONS

Herbert L. Thal, Jr., Cylindrical TE011/TM111 Mode Control by Cavity Shaping, IEEE Transactions on Microwave Theory and Techniques, Dec. 1, 1979, pp. 982-986, vol. MTT-27, No. 12.

*Primary Examiner* — Christopher P McAndrew
*Assistant Examiner* — Zannatul Ferdous

(57) ABSTRACT

The present invention relates to a measuring device for determining the thickness of a dielectric layer on a conductive substrate. The device comprises a resonance cavity for electromagnetic fields which has a rotationally symmetrical wall, an end plate and an open end and is adapted to be positioned with the open end on the dielectric layer. The device further comprises an antenna which is adapted to excite an electro-magnetic field in the resonance cavity, a reflection measuring unit for determining at least one property of the electromagnetic field and an evaluation circuit for determining the thickness of the dielectric layer from the at least one property of the electromagnetic field. A diameter of the rotationally symmetrical wall varies in a longitudinal direction of the resonance cavity.

21 Claims, 3 Drawing Sheets

(56) References Cited

U.S. PATENT DOCUMENTS

2011/0204890 A1* 8/2011 Habara ............ G01R 33/34053
  324/307
2015/0048843 A1* 2/2015 Hinken .................. G01B 15/02
  324/635

FOREIGN PATENT DOCUMENTS

JP   2009278346 A  * 11/2009
JP   2009278346 A    11/2009

* cited by examiner

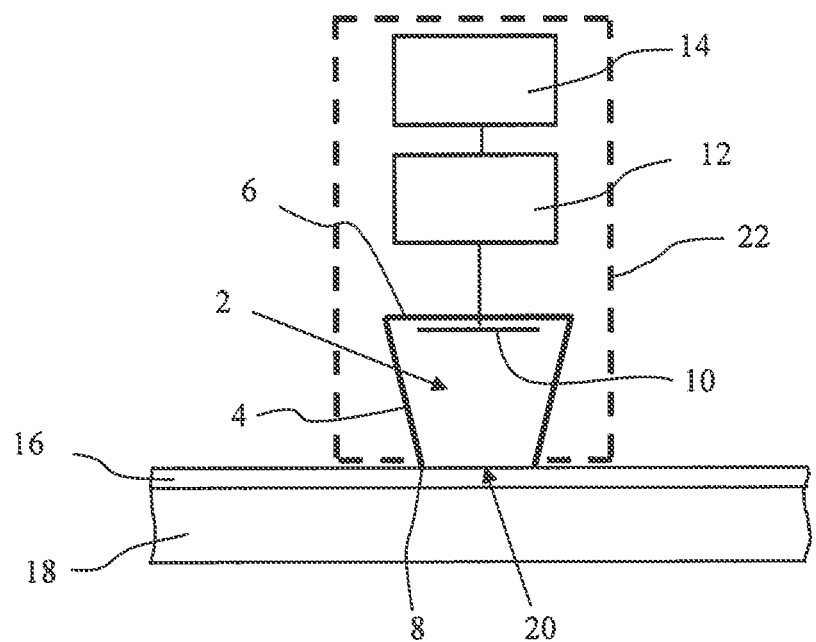
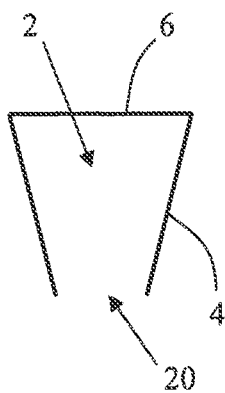 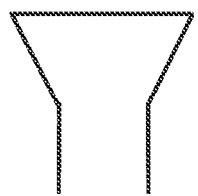 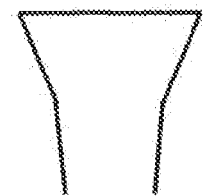 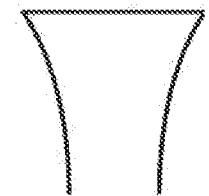
Fig. 2A    Fig. 2B    Fig. 2C    Fig. 2D
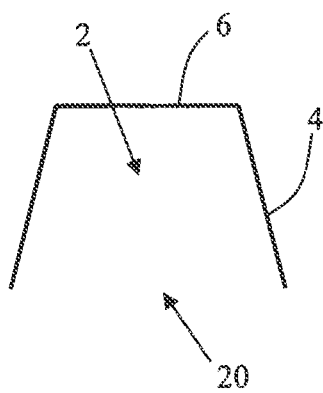 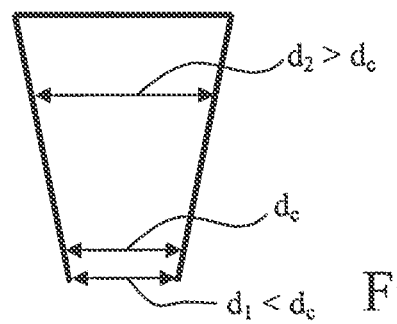
Fig. 3    Fig. 7

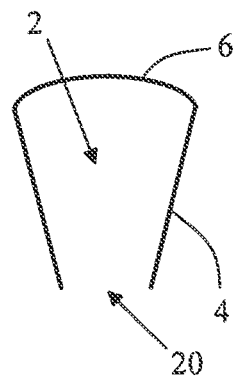
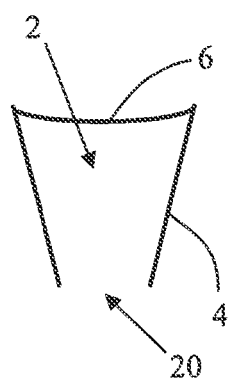
Fig. 6A    Fig. 6B
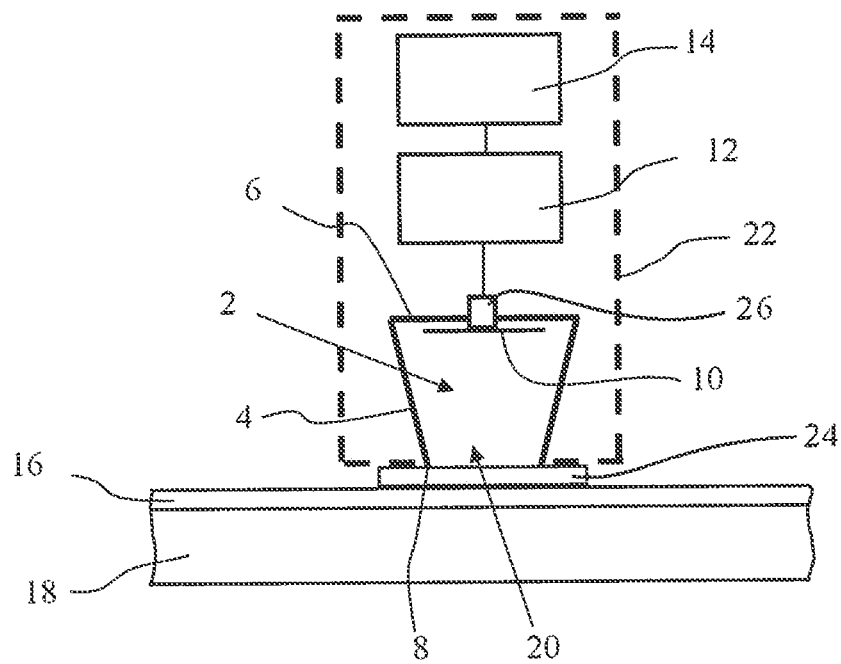
Fig. 9

DEVICE FOR MEASURING THE THICKNESS OF COATINGS

FIELD OF THE INVENTION

The present invention relates to a measuring device for determining the thickness of dielectric layers, e.g. a coat of paint or lacquering, on a conductive substrate by means of high-frequency electromagnetic fields in a resonance cavity.

STATE OF THE ART

In many industrial applications, e.g. in aircraft or motor vehicle construction, it is necessary for the thickness of dielectric layers applied to a conductive base material or substrate, which are intended to reduce corrosion or air resistance or are for decorative purposes, for example, to be accurately determined. In addition to this, particularly in the aviation sector, there are safety-relevant aspects in respect of lightning protection properties which require precise knowledge of the layer thickness, particularly on carbon-fibre-reinforced plastic, at which the application of different measuring processes is scarcely feasible. The thickness measurement should take place in a non-destructive manner. Possible base materials are metals, carbon-fibre-reinforced plastic or carbon-fibre-reinforced plastic with lightning protection (expanded copper foil (ECF) or mesh).

Thickness determination for this purpose by means of a cylindrical cavity resonator open on one side in the microwave range is known from the prior art, e.g. EP 2620741 A12, wherein the geometry-dependent resonance frequency of a certain natural oscillation is evaluated in order to determine the length of the cavity which is created along with the conductive substrate and therefore a layer thickness. Typically, the frequency change of a cylindrical resonator in relation to the change in length of the cavity resonator caused by the layer thickness is roughly 0.5 MHz/μm. The useful frequency range is limited in practice, e.g. also by legal guidelines. In effect, this results in a maximum measuring range of less than 500 μm within the permitted frequency bandwidth. Although the ratio of the change in frequency to the change in length can be influenced by a change in the cavity length or the cavity diameter within certain limits, many marginal conditions have to be observed in practice, which make this relationship difficult to change, in particular competing natural oscillations.

The substrate (base material) is possibly not isotropic, e.g. in the case of a carbon-fibre-reinforced plastic (with or without lightning protection) as is used in aircraft manufacture; the electrical conductivity may therefore be directionally dependent. Cylindrical cavity resonators in part indicate different resonance field configurations (so-called "modes") which lie around the same resonance frequency (described as "degeneration") and are therefore simultaneously excitable and are not distinguishable with the help of the frequency. This also applies in particular to the measurement of relevant modes. These degenerated modes are in some cases non-rotationally symmetrical, which in the case of a non-isotropic substrate results in the measuring result changing if the measuring unit is rotated (about the axis of the cylinder), i.e. the measuring unit is not "non-rotatable".

The problem addressed by the present invention is that of providing a measuring device for determining the thickness of dielectric layers which improves the measuring accuracy or else increases the measuring range and at the same time is non-rotatable.

SUMMARY OF THE INVENTION

According to the invention, the problem is solved by a measuring device for determining a thickness of a dielectric layer on an electrically conductive substrate comprising: a resonance cavity for electromagnetic fields which has a rotationally symmetrical wall and an end plate opposite an open end, wherein the resonance cavity is adapted to be positioned with the open end on the dielectric layer on the substrate, so that the substrate creates a wall of the resonance cavity; an antenna which is adapted to excite an electromagnetic field in the resonance cavity; a reflection measuring unit which is connected to the antenna and is configured to determine at least one property of the electromagnetic field in the resonance cavity; and an evaluation circuit which is connected to the reflection measuring unit and configured to determine the thickness of the dielectric layer from the at least one determined property of the electromagnetic field; wherein a diameter of the rotationally symmetrical wall varies in a longitudinal direction of the resonance cavity from the open end to the end plate.

In accordance with a further aspect of the measuring device, the antenna may be arranged within the resonance cavity.

According to a further aspect, the antenna may have a shape that is adapted to excite a field configuration corresponding to a TE0np mode, preferably a TE01p mode, more preferably a TE011 mode, wherein n and p are natural numbers.

According to a further aspect, a connection of the antenna to the reflection measuring unit may contain a filter that suppresses or supports the propagation of certain frequencies.

According to a further aspect, the filter may comprise a matching network which has a coaxial design and is configured with micro-strip technology.

According to a further aspect, the filter may comprise a matching network with an internal conductor which comprises portions with different diameters.

According to a further aspect, the antenna may be embedded in a ceramic substrate.

According to a further aspect, the entire resonance cavity may be filled with the ceramic substrate and the rotationally symmetrical wall and the end plate applied to the outside of the ceramic substrate as metal layers.

According to a further aspect, the variation in the diameter of the rotationally symmetrical wall 2 may be adapted in such a manner that the electromagnetic field has a field configuration corresponding to a TE0np mode, preferably a TE01p mode, further preferably a TE011 mode, wherein n and p are natural numbers.

According to a further aspect, the resonance cavity may take the shape of a truncated cone, a double truncated cone, a cylinder combined with a truncated cone or a combination thereof.

According to a further aspect, the shape of the rotationally symmetrical wall may be described by rotating a higher-order curve, preferably through a portion of a rotational hyperboloid or a rotational ellipsoid.

According to a further aspect, the variation in the diameter of the rotationally symmetrical wall from the open end to the end plate may run constantly, preferably smoothly.

According to a further aspect, the resonance cavity may be filled with a dielectric.

According to a further aspect, the rotationally symmetrical wall may be coated with a highly conductive material, preferably with silver, gold or copper.

According to a further aspect, the measuring device may comprise a screen for electromagnetic radiation.

According to a further aspect, the measuring device may comprise a dielectric cover which covers the opening at the open end.

According to a further aspect, a diameter of an opening may be smaller at the open end than the frequency-dependent cut-off diameter for cylindrical hollow waveguides at a given operating frequency.

According to a further aspect, a diameter of the end plate may be larger than a diameter of an opening at the open end.

According to a further aspect, the diameter of the rotationally symmetrical wall may increase from the open end in the direction of the end plate in a monotonic, preferably strictly monotonic, manner.

According to a further aspect, a diameter of the end plate may be smaller than a diameter of an opening at the open end.

According to a further aspect, the diameter of the rotationally symmetrical wall may decrease from the open end in the direction of the end plate in a monotonic, preferably strongly monotonic, manner.

BRIEF DESCRIPTION OF THE DRAWING

Exemplary embodiments of the invention are described in greater detail below with reference to the figures, wherein FIG. 1 shows a schematic image of the structure of a measuring device according to the invention as a sectional depiction;

FIGS. 2A to 2D show examples of preferred inner contours of a rotationally symmetrical wall of the resonance cavity;

FIG. 3 shows an exemplary inner contour of a rotationally symmetrical wall of the resonance cavity according to a further embodiment;

FIGS. 6A and 6B show examples of embodiments of the resonance cavity with a curved end plate;

FIG. 7 shows the diameter ratios of the resonance cavity of an embodiment;

FIG. 9 shows a further embodiment of the present invention.

DETAILED DESCRIPTION OF THE INVENTION

Figure 4:
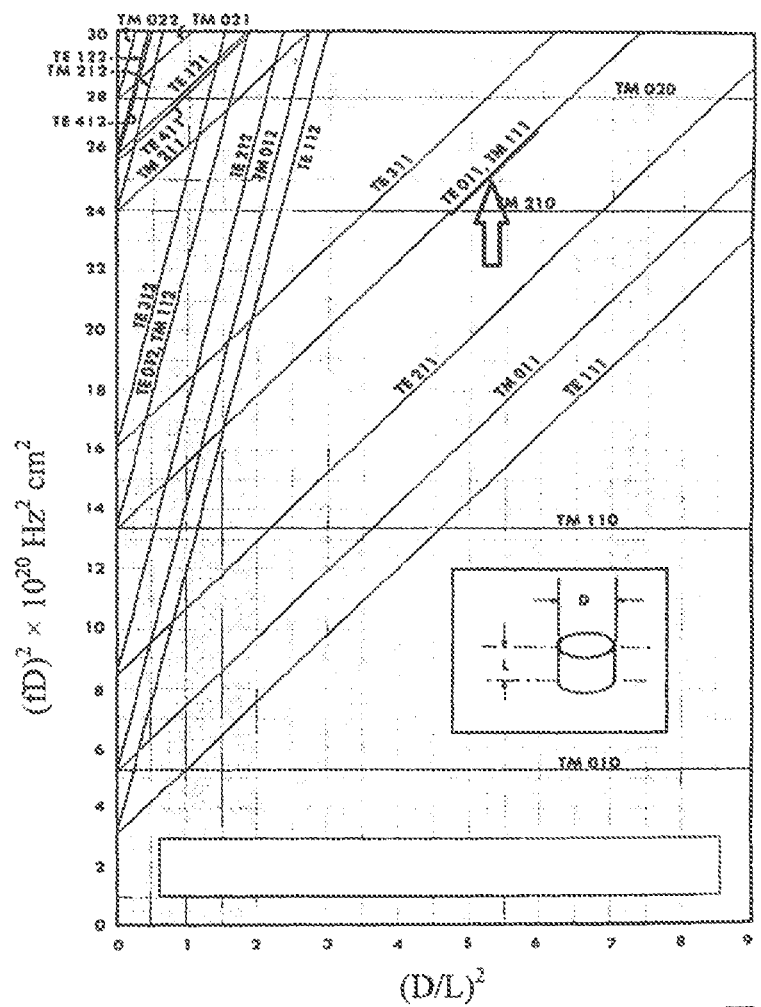
FIG. 4 shows a mode diagram for a circular cylindrical resonance cavity.

FIG. 1 shows a diagram of an embodiment of the measuring device according to the invention in section. An end plate 6 (or end wall) and a rotationally symmetrical wall 4 form a resonance cavity 2 for electromagnetic (wave) fields which is open at one end 8, wherein the diameter of the rotationally symmetrical wall 6 is not constant. The rotationally symmetrical wall 4 and the end plate 6 are made of a conductive material (metal). The resonance cavity 2 is adapted to be positioned with the open end 8 which lies opposite the end plate 6 on a dielectric layer 16 which is located on a substrate 18 made of a conductive material and the thickness whereof is to be measured. Furthermore, the device comprises an antenna 10 which is adapted to excite an electromagnetic field in the resonance cavity 2.

The end plate 6 and the rotationally symmetrical wall 4 are conductive and therefore form together with the substrate 18 a substantially closed cavity ("substantially" since the dielectric layer is located between the rotationally symmetrical wall and the substrate or an opening for a line connection of the antenna may also be present), in which cavity a vertical electromagnetic wave field, a so-called resonance or mode, can be excited by the antenna 10 at a suitable frequency. The measuring device or else the resonance cavity 2 are preferably configured in such a manner that the end plate 6 is arranged (substantially) parallel to the threshold between the substrate 18 and the dielectric layer 16 when the measuring device is placed on the layer 16. In other words, the edge of an opening 20 is preferably at the open end 8 of the resonance cavity 2 parallel to the end plate 6.

The end plate 6 is preferably rotationally symmetrical and has a cross-sectional profile which may be planar or curved, wherein a rotational axis of the end plate preferably coincides with a rotational axis of the rotationally symmetrical wall. "Curved" means either concave or convex, wherein the profile may follow a higher-order curve may follow, for example spherically, parabolically, hyperbolically or elliptically (cf. FIGS. 6A and 6B).

A property of the electromagnetic field in the resonance cavity 2 belonging to the vertical electromagnetic wave field is determined (measured), wherein it is also possible to determine more than one property of the electromagnetic field; at least one property of the electromagnetic field is therefore determined in the resonance cavity 2. The resonance frequency belonging to the vertical electromagnetic wave field, also referred to as the natural frequency, is preferably determined or measured by a reflection measuring unit 12 connected to the antenna 10. For this purpose, an electromagnetic wave is coupled by the antenna in the resonance cavity, wherein a particular frequency range is covered. When a resonance occurs, this becomes noticeable through a drop in the power measured at the reflection measuring unit, so that the resonance and the at least one associated property of the electromagnetic field, e.g. the resonance frequency, can be determined. The invention is explained below for the most part with the help of the resonance frequency measurement; if another property of the electromagnetic field is used for measuring, it will be clear to the person skilled in the art how the technical details have to be adapted. Examples of further useable properties are amplitude, real part, imaginary part and corresponding derivations of the reflected signal.

The at least one determined property of the electromagnetic field, in particular resonance frequency, is then used by a digital or analogue evaluation circuit 14 (or evaluation device) connected to the reflection measurement unit 12, e.g. a processor or an analogue circuit, in order to determine the thickness of the dielectric layer 16, which is possible since the at least one property of the electromagnetic field, in particular the resonance frequency, depends on the geometry of the resonance cavity 2, in particular on the distance from the end plate 6 and substrate 18.

The (internal) diameter of the rotationally symmetrical wall 4 varies in a longitudinal direction which extends from the open end 8 in the direction of the end plate 6 which therefore coincides with the rotational axis of the rotationally symmetrical wall 4. This variation in diameter means that the so-called degeneration of different field configurations which have the same resonance frequency in the case of a cylindrical wall is removed. FIG. 4 shows, based on the example of the cylindrical resonator, that some modes exhibit identical resonance frequencies. When using the cavity geometries forced here, FIG. 2 and FIG. 3, the resonance frequencies of these modes differ.

"Rotationally symmetrical wall" refers to the shape of the wall from the viewpoint of the resonance cavity. To be precise, this refers to a rotationally symmetrical inner surface or inner contour of the wall which is physically relevant in this case to the formation of electromagnetic wave fields (since marginal conditions exist at the interfaces). "Rotationally symmetrical" should be understood to mean that in a radial section, i.e. sectional plane perpendicular to the longitudinal direction or rotational axis, the rotationally symmetrical wall, to be more precise the inner contour thereof, is circular. In other words, the resonance cavity forms a rotational body. The variation in diameter means a variation in the diameter of these radial sectional circles in the longitudinal direction. The outer contour of the wall is independent of this, which means that it need not follow the inner contour and a rotationally symmetrical wall can therefore vary in thickness. Apart from a wall with a constant thickness in which the outer contour is identical to the inner one, any other outer shape is therefore also possible, e.g. a cylindrical shape with a constant (outer) diameter or a shape which has projections for fastening to a housing. This applies in the same way to the end plate which is preferably formed integrally with the rotationally symmetrical wall. A two- or multi-part embodiment is also possible, in which the end plate and the rotationally symmetrical wall are separate components which are fastened to one another.

A metal with a low thermal expansion coefficient is preferably used as the material for the rotationally symmetrical wall 4 and the end plate 6, in order to keep the temperature-dependence of the measuring result as small as possible. The inner surface of the planar and/or rotationally symmetrical wall is preferably coated with a highly conductive material, e.g. silver, gold or copper. In this way, a high quality factor of the resonance which depends on ohmic losses in the walls is achieved and the measuring accuracy is therefore improved, as the resonance frequency and, accordingly, the at least one property of the electromagnetic field used for measuring can be more accurately determined. As is customary, the ratio of a width of the resonance to the resonance frequency is referred to as the quality factor.

The antenna 10 is preferably located within the resonance cavity 2. If the antenna 10 is located inside the resonance cavity 2, the connection between the antenna 10 and the reflection measuring unit 12 passes through a small opening in the walls of the resonance cavity which is preferably located in the end plate 6.

A filter may furthermore be arranged in the connection between the antenna 10 and the reflection measuring unit 12, which filter suppresses or assists the propagation of certain frequencies. The filter may comprise a matching network (26) or it may be designed in the form of a matching network 26, cf. FIG. 9 for the general arrangement of the filter or matching network 26. The matching network is preferably integrated with or in the antenna.

The matching network 26 acts as a band-pass filter in the range of the useful frequency band and improves the quality factor of the measuring signal. It is of such dimensions that good impedance adjustment of the reflection measuring unit 12 to the resonance cavity 2 with the antenna 10 in connection with the natural frequency used is achieved.

Figure 8:
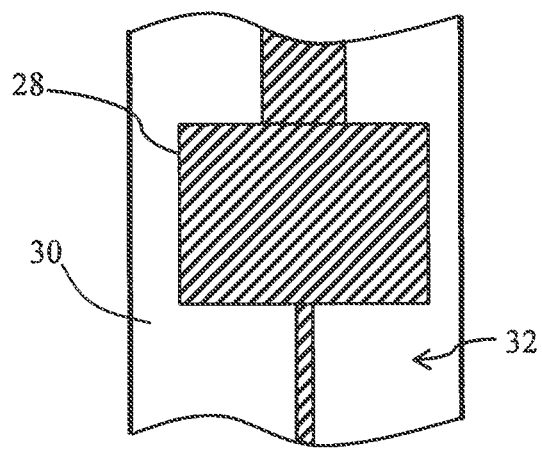
FIG. 8 shows a filter in the form of a matching network according to an embodiment.

The matching network 26 may, for example, have a coaxial design and/or be configured with micro-strip technology. An exemplary embodiment of the matching network with the coaxial design is depicted as an axial section in FIG. 8. In this embodiment, the matching network is integrated in an internal conductor 28, wherein the internal conductor exhibits different diameters, i.e. in the longitudinal or axial direction the internal conductor exhibits portions with different diameters. The different diameters of the internal conductor mean that the propagation of certain frequencies can be suppressed or amplified. It is particularly favourable when the matching network is optimized at the mid-frequency of the useful frequency band. The compensating network 26 may, furthermore, comprise an external conductor 30 and a dielectric 32 between the internal and external conductor, as depicted in FIG. 8.

The reflection measuring unit 12 is configured to measure the at least one property of the electromagnetic field in the resonance cavity, in particular a resonance frequency of the resonance cavity 2. In other words, apart from an actual reflection power measuring unit, the reflection measuring unit 12 may comprise an activating circuit and/or a power circuit for the antenna 10 (which is connected to the reflection measuring unit). Furthermore, the reflection measuring unit 12 may comprise a logic circuit which is configured to recognize the occurrence of a resonance and, where necessary, to control the antenna, in particular the frequency, via the activating circuit. The reflection measuring unit comprises an evaluating electronic system for determining a reflection factor of the antenna and identifying the occurrence of resonance from this.

The calculation by the evaluation circuit 14 may be based on modelling of the resonance cavity and associated properties of electromagnetic fields in the resonance cavity (in particular the resonance frequencies thereof), e.g. by means of a finite-element method and/or on calibration by means of layers of known thickness, e.g. films, wherein thicknesses between calibration points are interpolated in a suitable manner. In order to store the necessary data and operating software, the evaluation circuit may be connected to a store which may be integrated with the evaluation circuit, for example, or may also be separate therefrom. Furthermore, the measuring device, in particular the evaluation circuit 14, may be fitted with a communications interface which allows data to be exchanged with different units, e.g. with a computer or a mobile phone. In this way, data on the one hand, in particular measuring results, can be transmitted by the measuring device to other units and, on the other hand, operating software and data required for operation can be updated in the store connected to the evaluation circuit. An example of an application of the latter would be transmitting the dielectric constants of a layer to be measured to the evaluation circuit, in order to improve the measuring accuracy. Possible communication interfaces are wired parallel or serial interfaces (e.g. USB) or wireless interfaces (e.g. WLAN, Bluetooth) known in the art.

The resonance cavity 2 is filled with air as standard, although it may also be filled with a dielectric. In this way, the dimensions of the resonance cavity at a given resonance frequency are reduced by a factor of $\sqrt{\varepsilon_r}$, wherein $\varepsilon_r = \varepsilon/\varepsilon_0$ is the relative dielectric constant (permittivity) of the dielectric; $\varepsilon$ is the dielectric constant of the dielectric, $\varepsilon_0$ is that of the vacuum. Air is also a dielectric, however in this case $\varepsilon_r$ is very close to one ($\varepsilon_r=1.00059$). An existing dependency of the dielectric constant on parameters such as temperature or frequency must be taken into account where necessary, in order to guarantee an accurate measuring result.

A further embodiment of the resonance cavity 2 involves embedding the antenna 10 preferably arranged within the resonance cavity in a ceramic substrate (i.e. a ceramic volume body), wherein the entire resonance cavity is preferably filled with the ceramic substrate. For example, by using multi-layer ceramic substrates, the antenna 10 can be embedded in the ceramic substrate. By applying metallization to the outside of the substrate, the resonator can be formed, wherein the open end 8 remains free from the metallization; the rotationally symmetrical wall 4 and the end plate 6 are thereby formed as metal layer(s) on the outside of the ceramic substrate. The multi-layer ceramic substrate is structured in such a manner that the external shape corresponds to the shape of the resonance cavity. A preferred embodiment is in LTCC (Low Temperature Co-Fired Ceramics) or HTCC (High Temperature Co-Fired Ceramics) which are used in the high-temperature range. The ceramic substrate is simultaneously used as a dielectric. In this way, a highly compact, small structure of the resonance cavity and therefore of the measuring device is facilitated overall, since (at a given operating frequency) the dimensions of the resonance cavity are reduced due to the ceramic substrate acting as a dielectric and, moreover, the rotationally symmetrical wall and the end plate as metal layers are relatively thin, wherein they are supported by the ceramic substrate.

Furthermore, the measuring device may comprise a housing 22 (indicated by means of a dotted line in FIG. 1) in which at least the resonance cavity 2 is located. The reflection measuring unit 12 and/or the evaluation circuit 14 may also be accommodated in the housing. The housing 22 may be made of metal and at the same time act as a screen, in order to prevent the radiation of electromagnetic fields during operation. Apart from the screen integrated with the housing 22, a separate screen may also be provided.

Furthermore, the resonance cavity 2 may be provided with a dielectric cover 24, i.e. the opening 20 is covered by a layer of a dielectric material, so that a protective layer or protective film is created; cf. FIG. 9. This protects the inside of the resonance cavity 2 from environmental influences, in particular from the penetration of metal or dielectric impurities which can affect measurements. Furthermore, the measuring object is protected from damage due to contact with the metallic resonator. Preferred embodiments of the dielectric cover 24 are ceramics or plastics which may also be fibre-reinforced, for example.

In order to operate the measuring device, frequencies in the range of roughly 1 GHz to roughly 100 GHz are possible in principle. However, the operation of high-frequency units is subject to legal restrictions which will be known to the person skilled in the art. The ISM (ISM: Industrial, Scientific and Medical) volumes are provided for industrial applications. The frequency range of 24.0-24.25 GHz is preferably used; the operating frequency is therefore preferably 24.0-24.25 GHz. The measuring range of the measuring device (measuring range within the meaning of the range or distance between the minimum and maximum measurable thickness) is dictated by the shape of the cavity resonator. Aside from legal requirements, the frequency range is of course also determined by technical conditions (frequency generation, evaluating electronics, . . . ).

FIGS. 2A to 2D show different preferred embodiments of the shape of the resonance cavity 2 depicted as an axial section in each case (i.e. the rotational axis is in the sectional plane). For the sake of transparency, reference numbers are only entered in FIG. 2A; these apply accordingly to FIG. 2B-FIG. 2D. The embodiments differ in terms of the shape of the rotationally symmetrical wall 4 in each case.

In FIG. 2A the rotationally symmetrical wall 4 takes the shape of a truncated cone lateral surface and the resonance cavity 2 accordingly takes the shape of a truncated cone or a cone.

In FIG. 2B the resonance cavity 2 is in the shape of a cylinder combined with a truncated cone. The rotationally symmetrical wall accordingly takes the shape of a cylinder lateral surface combined with a truncated cone lateral surface. The cylinder is attached to the end of the truncated cone with the smaller diameter. It is evident that the cylinder may also lengthen the end of the truncated cone with the larger diameter.

In FIG. 2C two truncated cone shells are lined up against one another at a different angle between the respective lateral surfaces and the rotational axis. The resonance cavity 2 therefore takes the shape of two truncated cones lined up against one another with different opening angles.

FIG. 2D shows a trumpet-shaped embodiment; the rotationally symmetrical wall is created, for example, by rotating a partial portion of a hyperbola or ellipse, generally through rotation of a higher-order curve.

These embodiments should only serve as examples. It goes without saying that any other shapes are possible for the resonance cavity 2 and the rotationally symmetrical wall 4 too. In particular, it is possible for a plurality of the basic shapes shown, i.e. truncated cone, cylinder and curved or trumpet-shaped form, to be used as partial pieces and combined in any sequence. If a constant profile of the diameter of the rotationally symmetrical wall 4 is desired in the longitudinal direction, so that the diameters must be adapted at the ends of the partial pieces to the diameter of the adjacent partial piece in each case. In this way, a plurality of diameter variations and corresponding resonance cavities 2 can be obtained, e.g. including shapes in which the resonance cavity exhibits an indentation.

If the end plate 6 is not planar, the terms used here of "truncated cone" and "cylinder" must be understood to mean that each (actually planar) end face of the truncated cone or cylinder which coincides with the end plate is curved, so not planar. The resonance cavity in this case takes the shape of a truncated cone, a cylinder or a combination thereof only substantially, i.e. except for the end face which coincides with the end plate.

The variation in the diameter of the rotationally symmetrical wall 4 preferably runs constantly in the longitudinal direction from the open end in the direction of the end plate 6, wherein the variation is further preferably smooth. "Constant variation" means that there are no jumps in the diameter variation or that there are no steps in the wall. Furthermore, it may be required that there are no (circular) edges in the wall, which is guaranteed by a smooth profile of the variation. "Smooth" therefore means that in a suitable coordinate system in which the diameter is plotted against the longitudinal direction, the first derivation of the resulting curve is constant. Through a smooth embodiment, the quality of the resonance, in particular, can be improved.

As shown in FIGS. 2A-2D, a diameter of the end plate 6 is preferably larger than the diameter of the opening 20 at the open end 8 of the resonance cavity 2. This increase in diameter preferably has a monotonic profile, more preferably a strongly monotonic profile, in the longitudinal direction starting from the opening 20 at the open end 8 to the end plate 6. The diameter of the rotationally symmetrical wall 4 therefore increases monotonically (increasing by possible portions with a constant diameter) or strongly monotonically (continuously increasing). In this way, the resonance cavity 2 is not divided into sub-cavities which are separated by a point with a smaller diameter.

According to these reference methods, the variation in diameter in FIG. 2A is smooth and strongly monotonic, in FIG. 2B it is constant and monotonic, in FIG. 2C it is constant and strongly monotonic and in FIG. 2D it is smooth and strongly monotonic.

According to an alternative embodiment, a diameter of the end plate 6 is smaller than the diameter of the opening 20 at the open end 8 of the resonance cavity 2. The diameter of the rotationally shaped wall 4 preferably diminishes monotonically starting from the opening 20 in the direction of the end plate, more preferably strongly monotonically. This is shown by way of example in FIG. 3, in which the resonance cavity 2 takes the shape of a truncated cone, the larger end whereof coincides with the opening 20 at the open end 8 and the smaller end whereof coincides with the end plate 6. Similarly to FIGS. 2B-2D, other shapes are also possible here, e.g. truncated cones with a different opening angle, a cylinder shape or a curved shape or combinations thereof.

The nomenclature of different electromagnetic field configurations, referred to as modes, is based on the configurations well known in the case of circular-cylindrical wave conductors. A distinction is made between transverse magnetic TM waves, i.e. electrical field in the propagation direction, and transverse electric TE waves, i.e. magnetic field in the propagation direction. These are further characterized by two natural numbers (0, 1, 2, . . . ) m and n which express the number, m, of whole wavelengths in the circumferential direction and the number, n, of half wavelengths in the radial direction. If the cylindrical wave guide is closed at both ends by planar conductors, vertical waves are obtained through reflection in the case of resonance, wherein a further natural number p expresses the number of half waves in the longitudinal direction. Overall, this therefore results in TMmnp and TEmnp modes. Due to physical peripheral conditions, not all random combinations of these three numbers are possible. Since the resonance cavity 2 does not deviate greatly from a (circular) cylinder shape, in particular the rotational symmetry is retained, this nomenclature can continue to be used (in the case of low-order modes and small cone angles).

FIG. 4 shows a mode diagram for a circular-cylindrical resonance cavity with a diameter D and a length L. In the graph the square of the product of resonance frequency f and diameter D is plotted against the square of the quotient of diameter D and length L for some modes. It should be recognised in this case that with the exception of modes with index TMmn0 (in other words TM010, TM110, TM210 in the graph) the resonance frequency f changes at a given diameter D with the changing length L. The thickness measurement by means of microwave radiation in a resonance cavity is based on this effect. Of course the geometry, in other words the diameter and length, should be selected in such a manner that a clear division between different (non-degenerated) modes is possible, since otherwise different modes with a different frequency behaviour can be excited upon a change in length and the assignment between frequency change and length change is no longer possible. In the region $(D/L)^2<1.5$, for example, there are too many natural frequencies of different modes, which means that this region is not suitable.

FIG. 4 also shows the typical degeneration of TE0np and TM1np modes for cylinder resonators. "Degeneration" in this case means that different modes exhibit the same resonance frequency. For example, this is indicated using an arrow for modes TE011 and TM111.

TE0np modes are advantageous for a thickness measurement of a dielectric layer in two respects compared with TM1np modes. To begin with, unlike TM1np modes, TE0np modes are rotationally symmetrical. In the case of a non-isotropic substrate such as carbon-fibre-reinforced plastic (possibly with metallic inserts), for instance, which possibly exhibits non-isotropic conductivity, the measurement is invariant when using a TE0np mode during rotation of the measuring device; the measuring device is therefore non-rotatable. Secondly, with a TE0np mode, unlike in the case of a TM1np mode, the electrical field on the two end faces, in particular, therefore, of the layer to be measured, quickly drops to zero, as in the case of a TE mode, the electrical field is transverse to the propagation direction and therefore parallel to the conductive end faces of the resonator (substrate, end plate) and therefore has to disappear there. The influence of the dielectricity constant of the dielectric layer on the measurement is therefore small in the case of a TE0np mode.

A removal of the degeneration, i.e. separation of the resonance frequencies between the TE0np and TM1np modes is achieved by the shaping according to the invention of the rotationally symmetrical wall of the measuring device, in other words through the variation in diameter of the rotationally symmetrical wall 4 in the longitudinal direction which leads to a mode-dependent displacement of the resonance frequencies. The TE0np mode, preferably TE01p mode, more preferably TE011 mode, is used for thickness measurement, the variation in diameter of the rotationally symmetrical wall 4 is therefore adapted accordingly.

The cavity resonator must exhibit a given, frequency-dependent, minimum diameter as the cut-off diameter at at least one of the ends of the circular symmetrical resonance chamber, so that an electromagnetic field with the shape TE0np, for example, can be excited within the useful frequency range (natural resonance condition). In the mode diagram, FIG. 4, the frequency-dependent and geometric conditions for fulfilment of the natural resonance conditions of different modes are illustrated based on the example of a cavity resonator with a cylindrical side wall.

According to a preferred embodiment, the opening 20 which is formed at the open end 8 of the resonance cavity 2 has a smaller diameter at a given operating frequency of the measuring device than the frequency-dependent cut-off diameter $d_c$ for cylindrical hollow conductors. Due to the so-called evanescent portion of the electromagnetic wave field which projects beyond the opening, a thickness determination is still possible. Of course in a region of the resonance cavity 2 in which the field is excited by the antenna 10 and which is preferably located near the end plate 6, the diameter of the rotationally symmetrical wall 4 is greater than the cut-off diameter $d_c$, so that a wave field can result. However, the electromagnetic field on the opposite side with the open end 8 does not drop to zero immediately in the region of the cut-off diameter, but generally exponentially, this portion is the evanescent portion of the wave function which is used for layer thickness measurement.

FIG. 7 shows a resonance cavity in which the corresponding diameter conditions of the embodiment described above are entered for a TE0np mode by way of explanation; in this case, reference numbers have been dispensed with in the interests of transparency (cf. FIG. 2A for reference numbers). The following applies to the dimensions of the diameter $d_1$ of the rotationally symmetrical wall 4 of the open end 8:

$$d_1 < \frac{X'_{0n}}{\pi}\lambda$$

The following applies to the dimensions of the diameter $d_2$ of the rotationally symmetrical wall (4) in the region of the end plate 6:

$$d_2 > \frac{X'_{0n}}{\pi}\lambda$$

wherein $d_{1/2}$ is the diameter on the rotationally symmetrical wall 4 at the respective position, $X'_{0n}$ is a zero point of the derivation of the Bessel function which describes the TE0n mode in the radial direction and $\lambda$ is the cavity wavelength of the highest frequency in the frequency band used.

The cut-off diameter $d_c$ is obtained from:

$$d_c = \frac{X'_{0n}}{\pi}\lambda$$

Although this formula is not strictly applicable to conical resonators, in the case of conical (or generally non-cylindrical) resonators with small opening angles, for example 12° (half the opening angle), the concept of the cut-off diameter $d_c$ can, however, be used to provide a close approximation of the diameters. The half opening angle preferably lies in the range of 8° to 12°.

It has been established that this small diameter of opening 20 results in the frequency change being smaller with different layer thicknesses, so that the ratio (expressed as MHz/μm) of frequency change to length change of the resonator (which is determined by the thickness of the layer) becomes smaller and this ratio can be selectively set. The measuring region can therefore be enlarged and selectively set in the case of a predefined usable frequency range; e.g. to at least 500 μm, preferably to at least 1000 μm. The corresponding range of measurable layer thicknesses need not start at 0 μm and in the case of a measuring range of 500 μm or 1000 μm, for example, it may be adjusted from 0 μm to 500 μm or from 0 μm to 1000 μm in such a manner that the range of measurable layer thicknesses starts with a layer thickness that is greater than 0 μm. For example, once again in the case of a measuring range of 500 μm or 1000 μm, from 100 μm to 600 μm or from 100 μm to 1100 μm or generally from N μm to N+500 μm or from N μm to N+1000 μm, wherein N is a natural number greater than or equal to 0. 500 μm and 1000 μm have been used by way of example; other measuring ranges are of course also possible.

Conversely, it has been established that through an enlargement of the diameter of the opening 20 it is possible for the ratio of frequency change to length change to be increased. In this way, the measuring accuracy or measuring resolution can be increased, wherein the measuring range becomes correspondingly smaller in the case of a defined usable frequency range. The measuring accuracy may be smaller than 20 nm, preferably smaller than 10 nm. This then produces, for example, a resonance cavity 2 shape in which the diameter of the rotationally symmetrical wall 4 diminishes in the direction of the end plate 6 starting from the opening 20, for example a truncated cone, in which the end plate is located at the smaller end, as depicted in FIG. 3.

Figure 5:
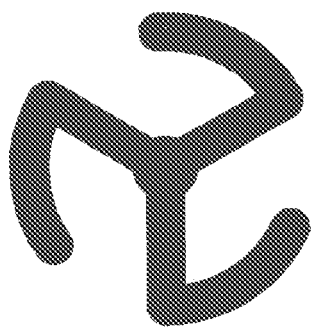
FIG. 5 shows an antenna according to a preferred embodiment.

FIG. 5 shows a top view, i.e. in the longitudinal direction when the antenna is fitted, on an antenna 10 according to a preferred embodiment. The antenna is adapted in shape (in particular with regard to rotational symmetry) to excite a TE0np mode, preferably a TE01p mode, more preferably a TE011 mode. The figure shows by way of example an antenna with three arms, however, an antenna with 2 or 4 or another number of arms, or also a different shape, is of course also conceivable, wherein rotational symmetry should exist wherever possible (in respect of rotations about given angles).

FIG. 6A and FIG. 6B depict resonance cavities 2 with a non-planar end plate 6 in an axial section. In FIG. 6A the end plate 6 is curved inwardly (so curved into the resonance cavity 2); in FIG. 6B the end plate 6 is curved outwardly. In FIGS. 6A, 6B, for example, a conical shape is chosen as the rotationally symmetrical wall 4; it is possible, however, for every other of the aforementioned contours of the rotationally symmetrical wall to be used and combined with a curved end plate 6.

FIG. 9 shows an embodiment of the present invention in which further optional elements are shown which have already been described above. To be more precise, these elements are the filter or the matching network 26 and the dielectric cover 24 which may be provided independently of one another. The dielectric cover 24 is arranged at the open end 8 at the opening 20, covers said opening and acts as a protective layer, as has already been described above. The dielectric cover 24 is fastened to the open end 8 or possibly to the housing 22 in a suitable manner, preferably removably. When using the measuring device, the dielectric cover is located between the resonance cavity 2 and the dielectric layer 16, the thickness of which is to be determined. The thickness of the dielectric cover 24 must therefore be taken into account when measuring. The filter or the matching network 26 is arranged in the connection between the antenna 10 and reflection measuring unit 12, e.g. close to the antenna or integrated with the antenna (so that an antenna with filter is obtained). Apart from these two additional features (dielectric cover, matching network), the embodiment in FIG. 9 is the same as that in FIG. 1; the comments made in relation to FIG. 1 likewise apply here accordingly.

REFERENCE LIST

2 Resonance cavity
4 Rotationally symmetrical wall
6 End plate
8 Open end
10 Antenna
12 Reflection measuring unit
14 Evaluation circuit
16 Dielectric layer
18 Substrate
20 Opening at the open end of the resonance cavity
22 Housing
24 Dielectric cover
26 Matching network
28 Internal conductor with integrated matching network
30 External conductor
32 Dielectric
$d_c$ Cut-off diameter

The invention claimed is:

1. A measuring device for determining a thickness of a dielectric layer (16) of an electrically conductive substrate (18) comprising:
- a resonance cavity (2) for electromagnetic fields which has a rotationally symmetrical wall (4) and an end plate (6) opposite an open end (8), wherein the resonance cavity (2) is adapted to be positioned with the open end (8) on the dielectric layer (16) on the substrate (18), so that the substrate creates a wall of the resonance cavity;
- an antenna (10) which is adapted to excite an electromagnetic field in the resonance cavity;
- a reflection measuring unit (12) which is connected to the antenna (10) and is configured to determine at least one property of the electro-magnetic field in the resonance cavity (2); and
- an evaluation circuit (14) which is connected to the reflection measuring unit (12) and configured to determine the thickness of the dielectric layer (16) from the at least one determined property of the electromagnetic field;
- wherein a diameter of the rotationally symmetrical wall (4) varies in a longitudinal direction of the resonance cavity (2) from the open end (8) to the end plate (6);
- wherein a diameter if an opening (20) is smaller at the open end (8) than a frequency-dependent cut-off diameter ($d_c$) for cylindrical hollow waveguides at a given operating frequency.

2. The measuring device according to claim 1, wherein the antenna (10) is arranged within the resonance cavity (2).

3. The measuring device according to claim 2, wherein the antenna (10) has a shape that is adapted to excite a field configuration corresponding to a TE0np mode, preferably a TE01p mode, more preferably a TE011 mode, wherein n and p are natural numbers.

4. The measuring device according to claim 1, wherein a connection of the antenna (10) to the reflection measuring unit (12) contains a filter that suppresses or supports the propagation of certain frequencies.

5. The measuring device according to claim 4, wherein the filter comprises a matching network (26) which has a coaxial design and/or is configured with micro-strip technology.

6. The measuring device according to claim 4, wherein the filter comprises a matching network (26) with an internal conductor (28) which comprises portions with different diameters.

7. The measuring device according to claim 1, wherein the antenna (10) is embedded in a ceramic substrate.

8. The measuring device according to claim 7, wherein the entire resonance cavity (2) is filled with the ceramic substrate and the rotationally symmetrical wall (4) and the end plate (6) applied to the outside of the ceramic substrate as metal layers.

9. The measuring device according to claim 1, wherein the variation in the diameter of the rotationally symmetrical wall (2) is adapted in such a manner that the electromagnetic field has a field configuration corresponding to a TE0np mode, preferably a TE01p mode, further preferably a TE011 mode, wherein n and p are natural numbers.

10. The measuring device according to claim 1, wherein the resonance cavity (2) takes the shape of a truncated cone, a double truncated cone, a cylinder combined with a truncated cone or a combination thereof.

11. The measuring device according to claim 1, wherein the shape of the rotationally symmetrical wall (4) is described by rotating a higher-order curve, preferably through a portion of a rotational hyperboloid.

12. The measuring device according to claim 1, wherein the variation in the diameter of the rotationally symmetrical wall (4) from the open end (8) to the end plate (6) runs constantly, preferably smoothly.

13. The measuring device according to claim 1, wherein the resonance cavity (2) is filled completely with a dielectric.

14. The measuring device according to claim 1, wherein the rotationally symmetrical wall (4) is coated with a highly conductive material, preferably with silver, gold or copper.

15. The measuring device according to claim 1, further comprising a screen for preventing electromagnetic radiation.

16. The measuring device according to claim 1, further comprising a dielectric cover (24) which covers the opening (20) at the open end (8).

17. A measuring device for determining a thickness of a dielectric layer (16) of an electrically conductive substrate (18) comprising:
- a resonance cavity (2) for electromagnetic fields which has a rotationally symmetrical wall (4) and an end plate (6) opposite an open end (8), wherein the resonance cavity (2) is adapted to be positioned with the open end (8) on the dielectric layer (16) on the substrate (18), so that the substrate creates a wall of the resonance cavity;
- an antenna (10) which is adapted to excite an electromagnetic field in the resonance cavity;
- a reflection measuring unit (12) which is connected to the antenna (10) and is configured to determine at least one property of the electro-magnetic field in the resonance cavity (2); and
- an evaluation circuit (14) which is connected to the reflection measuring unit (12) and configured to determine the thickness of the dielectric layer (16) from the at least one determined property of the electromagnetic field;
- wherein a diameter of the rotationally symmetrical wall (4) varies in a longitudinal direction of the resonance cavity (2) from the open end (8) to the end plate (6),
- wherein a diameter if an opening (20) is smaller at the open end (8) than a frequency-dependent cut-off diameter ($d_c$) for cylindrical hollow waveguides at a given operating frequency.

18. The measuring device according to claim 1, wherein a diameter of the end plate (6) is larger than a diameter of an opening (20) at the open end (8).

19. The measuring device according to claim 1, wherein the diameter of the rotationally symmetrical wall (4) increases from the open end (8) in the direction of the end plate (6) in a monotonic, preferably strictly monotonic, manner.

20. The measuring device according to claim 1, wherein a diameter of the end plate (6) is smaller than a diameter of an opening (20) at the open end (8).

21. The measuring device according to claim 1, wherein the diameter of the rotationally symmetrical wall (4) may decrease from the open end (8) in the direction of the end plate (6) in a monotonic, preferably strongly monotonic, manner.

* * * * *

UNITED STATES PATENT AND TRADEMARK OFFICE
CERTIFICATE OF CORRECTION

PATENT NO. : 11,313,664 B2
APPLICATION NO. : 16/318372
DATED : April 26, 2022
INVENTOR(S) : Christian Ziep et al.

It is certified that error appears in the above-identified patent and that said Letters Patent is hereby corrected as shown below:

In the Claims

Column 13, Line 25, "wherein a diameter if an opening (20)" should read --wherein a diameter of an opening (20)--;

Column 14, Line 43, "wherein a diameter if an opening (20)" should read --wherein a diameter of an opening (20)--.

Signed and Sealed this
Fifth Day of July, 2022

Katherine Kelly Vidal
*Director of the United States Patent and Trademark Office*